United States Patent
Dryjanski et al.

(10) Patent No.: US 12,449,267 B2
(45) Date of Patent: *Oct. 21, 2025

(54) CASUAL DRIVER RIDE SHARING

(71) Applicant: Lyft, Inc., San Francisco, CA (US)

(72) Inventors: David Dryjanski, San Francisco, CA (US); Lev Popov, San Francisco, CA (US); Timothy Brown, San Francisco, CA (US); Logan Green, San Francisco, CA (US); Austin Broyles, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/612,864

(22) Filed: Mar. 21, 2024

(65) Prior Publication Data

US 2024/0230346 A1    Jul. 11, 2024

Related U.S. Application Data

(63) Continuation of application No. 18/149,425, filed on Jan. 3, 2023, now Pat. No. 11,940,284, which is a
(Continued)

(51) Int. Cl.
*G06Q 10/1093*  (2023.01)
*G01C 21/34*  (2006.01)
(Continued)

(52) U.S. Cl.
CPC ....... *G01C 21/3438* (2013.01); *G01C 21/343* (2013.01); *G01S 19/42* (2013.01);
(Continued)

(58) Field of Classification Search
CPC .......... G01C 21/3438; G01C 21/3484; G01C 21/34; G01C 21/343; G06Q 10/063114;
(Continued)

(56) References Cited

U.S. PATENT DOCUMENTS 6,687,678 B1 * 2/2004 Yorimatsu .......... G06Q 10/0631
                                                    705/7.12
9,976,863 B2 * 5/2018 Dryjanski .............. G07B 15/02
(Continued)

FOREIGN PATENT DOCUMENTS

| KR | 10-2015-90969 A | 8/2015 |
|---|---|---|
| WO | 2007/139375 A1 | 12/2007 |
| WO | 2017/172971 A1 | 10/2017 |

OTHER PUBLICATIONS

Real-time Rideshare Matching Problem; Jan. 2010 (Year: 2010).*
(Continued)

*Primary Examiner* — Yuri Kan
(74) *Attorney, Agent, or Firm* — Keller Preece PLLC

(57) ABSTRACT

A system for casual driver ride sharing includes an interface and processor. The interface is to receive a request for a ride from a user, wherein the request includes GPS information for the user. The processor is to determine compatibility between the typical route information and the request for the ride; determine a ranked list based at least in part on the compatibility; and provide a ride offer to a driver of the one or more casual drivers based at least in part on the ranked list.

20 Claims, 10 Drawing Sheets

Related U.S. Application Data continuation of application No. 16/859,773, filed on Apr. 27, 2020, now Pat. No. 11,549,818, which is a continuation of application No. 15/956,459, filed on Apr. 18, 2018, now Pat. No. 10,634,510, which is a continuation of application No. 15/143,406, filed on Apr. 29, 2016, now Pat. No. 9,976,863.

(60) Provisional application No. 62/314,894, filed on Mar. 29, 2016.

(51) Int. Cl.
  *G01S 19/42*  (2010.01)
  *G06Q 10/00*  (2023.01)
  *G07B 15/02*  (2011.01)
  *G08G 1/00*  (2006.01)
  *H04W 4/14*  (2009.01)

(52) U.S. Cl.
  CPC ............ *G07B 15/02* (2013.01); *G08G 1/202* (2013.01); *H04W 4/14* (2013.01)

(58) Field of Classification Search
  CPC .. G06Q 10/02; G06Q 10/025; G06Q 10/1093; G06Q 10/06311; G06Q 10/00; B60T 8/246; B60K 6/46; G10L 15/193; G08G 1/202; G01S 19/42
  See application file for complete search history.

(56) References Cited

U.S. PATENT DOCUMENTS

| | | | | |
|---|---|---|---|---|
| 10,634,510 | B2* | 4/2020 | Dryjanski | ............ G01C 21/343 |
| 11,549,818 | B2* | 1/2023 | Dryjanski | ............... G01S 19/42 |
| 11,940,284 | B1* | 3/2024 | Dryjanski | ............... G01S 19/42 |
| 2004/0158483 | A1* | 8/2004 | Lecouturier | ......... G06Q 10/025 |
| | | | | 705/6 |
| 2008/0195428 | A1* | 8/2008 | O'Sullivan | ............ G06Q 50/30 |
| | | | | 705/6 |
| 2009/0172009 | A1 | 7/2009 | Schmith et al. | |
| 2010/0114626 | A1 | 5/2010 | Piccinini et al. | |
| 2011/0184622 | A1* | 7/2011 | Yamada | ................... B60K 6/46 |
| | | | | 701/99 |
| 2014/0006137 | A1* | 1/2014 | Melen | ................ G06Q 10/1093 |
| | | | | 705/14.35 |
| 2014/0330505 | A1* | 11/2014 | Wenneman | ........ G01C 21/3484 |
| | | | | 701/117 |
| 2015/0106096 | A1* | 4/2015 | Toopran | ................ G10L 15/193 |
| | | | | 704/244 |
| 2015/0161564 | A1* | 6/2015 | Sweeney | ........ G06Q 10/063114 |
| | | | | 705/338 |
| 2015/0254581 | A1 | 9/2015 | Brahme | |
| 2016/0042303 | A1* | 2/2016 | Medina | .................. G06Q 10/02 |
| | | | | 705/5 |
| 2016/0297478 | A1* | 10/2016 | Inoue | ...................... B60T 8/246 |
| 2017/0123421 | A1* | 5/2017 | Kentley | ................ G06Q 10/00 |
| 2018/0238695 | A1 | 8/2018 | Dryjanski et al. | |

OTHER PUBLICATIONS

Examination Report as received in Australian application 2017245260 dated Oct. 4, 2018.
Examination Report as received in Australian application 2019240697 dated Sep. 22, 2020.
International Search Report & Written Opinion as received in PCTUS2017024829 dated Jun. 30, 2017.
Office Action as received in Canadian application 3,018,756 dated Oct. 10, 2018.
Office Action as received in Canadian application 3,018,756 dated May 29, 2019.
Real-time Rideshare Matching Problem; Jan. 2010.
U.S. Appl. No. 15/143,406, May 9, 2017, Office Action.
U.S. Appl. No. 15/143,406, Sep. 13, 2017, Office Action.
U.S. Appl. No. 15/143,406, Mar. 19, 2018, Notice of Allowance.
U.S. Appl. No. 15/956,459, Sep. 20, 2019, Office Action.
U.S. Appl. No. 15/956,459, Jan. 10, 2020, Notice of Allowance.
U.S. Appl. No. 16/859,773, Oct. 21, 2021, Office Action.
U.S. Appl. No. 16/859,773, Jan. 26, 2022, Office Action.
U.S. Appl. No. 16/859,773, May 3, 2022, Office Action.
U.S. Appl. No. 16/859,773, Sep. 14, 2022, Notice of Allowance.
U.S. Appl. No. 18/149,425, Sep 29, 2023, Office Action.
U.S. Appl. No. 18/149,425, Nov. 22, 2023, Notice of Allowance.

* cited by examiner

CASUAL DRIVER RIDE SHARING

CROSS REFERENCE TO RELATED APPLICATIONS

This application is a continuation of U.S. patent application Ser. No. 18/149,425 filed on Jan. 3, 2023, which is a continuation of U.S. patent application Ser. No. 16/859,773, filed on Apr. 27, 2020, which issued as U.S. Pat. No. 11,549,818, which is a continuation of U.S. patent application Ser. No. 15/956,459, filed on Apr. 18, 2018, which issued as U.S. Pat. No. 10,634,510, which is a continuation of U.S. patent application Ser. No. 15/143,406, filed Apr. 29, 2016 which issued as U.S. Pat. No. 9,976,863, which claims priority to U.S. Provisional Patent Application No. 62/314,894, filed Mar. 29, 2016. The aforementioned applications are hereby incorporated by reference in their entirety.

BACKGROUND OF THE INVENTION

A ride sharing system connects drivers who wish to share their vehicles with riders looking for a ride. A typical ride sharing system connects a driver with a rider based on how close the driver is to the rider. However, in some cases, proximity is not a good measure of the efficiency of their connection.

BRIEF DESCRIPTION OF THE DRAWINGS

Various embodiments of the invention are disclosed in the following detailed description and the accompanying drawings.

DETAILED DESCRIPTION

Figure 1:
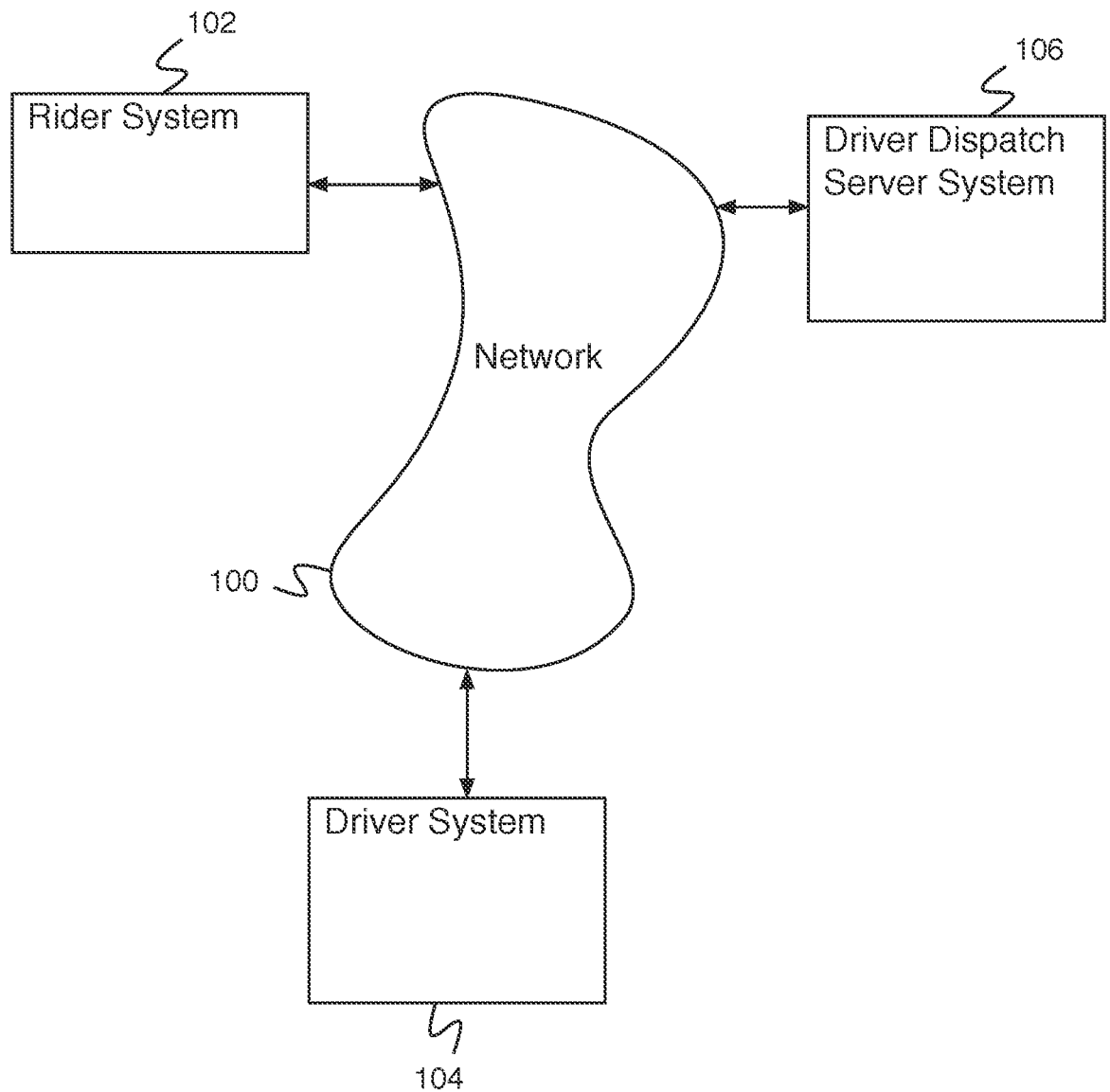
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for casual driver ride sharing, comprises an interface to receive an acceptance from one or more casual drivers, wherein a driver is associated with a typical route, and receive a request for a ride from a user; and a processor to determine compatibility between the typical route and the request for one or more drivers, determine a ranked list based at least in part on the compatibility, and provide a ride offer to a driver of the one or more casual drivers based at least in part on the ranked list. In some embodiments, the system for casual driver ride sharing additionally comprises a memory coupled to the processor and configured to provide the processor with instructions.

In some embodiments, a system for casual driver ride sharing comprises a system for matching a driver with a rider. The system for casual driver ride sharing matches a driver making a typical route with a rider desiring a ride that is compatible with the typical route. In some embodiments, one or more casual drivers accept to be part of the casual driver ride sharing system. A casual driver is associated with a typical route (e.g., a commuting route). In some embodiments, the typical route is provided to the system by the driver. In some embodiments, the driver commutes normally and the system determines the typical route for the driver. A rider requests a ride from a casual driver. In some embodiments, the rider is given the option to request a ride from a casual driver when the ride is requested. When the system for casual driver ride sharing receives a request for a ride from a casual driver, the system determines compatibility between the ride request and the typical route for one or more of the casual drivers. In some embodiments, compatibility comprises a route compatibility (e.g., how similar is the request to the typical route), a time compatibility (e.g., how much extra time does performing the ride request take the driver), or any other appropriate compatibility metric. In some embodiments, the system requests that a driver begin the associated typical route in order to perform a casual ride request. In some embodiments, the system receives an indication that a driver is to begin the associated typical route in order to determine availability for a casual ride request. The system determines a ranked list based at least in part on the compatibility and provides a ride offer to a driver based on the ranked list (e.g., the system chooses the driver associated with the most compatible typical route). In some embodiments, multiple drivers get a request at the same time—for example, N drivers from the ranked list are provided with the request at the same time (e.g., the top N of the list). In various embodiments, a mechanism for selecting drivers comprises using one or more of the following: a driver's history of rides with the passenger, a driver's history of accepting ride requests, a driver's history of completing rides, a driver's ratings, or using any other appropriate information. In some embodiments, driver requests come in as push notification or short message service (SMS), so that the driver does not need to check for requests manually or enter into a specific mode in an app. In some embodiments, the system provides the driver with the extra distance and extra time estimates for performing the ride request, so the driver can decide whether to perform the request. In the event the driver declines the request, the next driver on the ranked list is chosen and provided with the ride offer. In the event the driver accepts the ride request, the acceptance is provided to the rider. In some embodiments, the rider is provided with the total estimated ride time and distance and given the option to accept or decline the ride.

In some embodiments, the rider pickup location is determined using a position measured for the rider system (e.g., using global positioning system (GPS) or other location information) and the typical commute time and routes are automatically determined for a casual driver automatically using a position measured for the driver system (e.g., using global positioning system (GPS) or other location information). In some embodiments, the position information of the rider and rider's desired destination and desired time is matched with a set of drivers' typical commute routes/times to generate a ranked list of compatible potential rides. In some embodiments, the ranked list is then used to offer the rides to a casual driver and if accepted is offered to a rider to receive a ride from the casual driver that accepted. In some embodiments, in the event that a driver accepts a rider and alters the typical route of the commute to perform the ride, the ride is not included in the automatic storage or calculation of a typical route and/or time for the driver.

In some embodiments, start and stop locations for a route (e.g., a commute route) are determined using previous locations the user has entered (e.g., an entered address and/or an entered latitude and longitude). In some embodiments, a route (e.g., a commute route) is determined using significant changes location data (e.g., a detection of a significant location change data—for example using cell tower location information or other appropriate location information).

In some embodiments, casual driver availability is filtered using location and commute information. For example, in the event that the driver is not in a location appropriate for starting a commute (e.g., not at home location, already at work, out of state location, etc.), requests for rides are not provided to the driver.

In some embodiments, passenger profiles are provided to drivers during dispatch to help them decide on whether to accept that person's ride request. In various embodiments, passenger profile information includes personal information (e.g., photo, music preferences, hobby information, etc.), employer information (e.g., company, title, etc.), user ratings, acceptance rate, reliability metrics, or any other appropriate information. In some embodiments, passenger profiles include employer information that is determined based on a passenger verified email address. For example, the email address is used to determine employer information (e.g., web look up based on email address).

In some embodiments, a sign up for being a casual driver is easy and requires little or no effort to stay active in the system. In some embodiments, post sign up, interaction is only required with the system when there is a ride (and/or compensation) involved. In some embodiments, the system prompts for push permissions without a ride and/or compensation being involved. Sign up includes entering a phone number and verification, a background location and push permissions, and a driver's license copy. In some embodiments, a work email is also collected for employer verification (e.g., a check is performed using the driver's employer and any background check that they have previously collected is used as a check for the driver). In various embodiments, a user provides a name or it is automatically derived from the driver's license, a user provides a photo or it is automatically derived from the driver's license, a user provides a home and work locations or the downloaded user app system automatically determines the home and work locations based on patterns of the user's phone locations, a user provides a car photo, make, model, color, year, a car plate, a Facebook™ account, and payout information. In some embodiments, a division of motor vehicle (DMV) check is performed on the driver using the driver's license information. In some embodiments, insurance information is collected from the driver.

In some embodiments, only one rider is allowed for any given driver to make it efficient for a driver (e.g., not too much time lost in taking on a rider).

FIG. 1 is a block diagram illustrating an embodiment of a network system. In the example shown, FIG. 1 comprises network 100. In various embodiments, network 100 comprises one or more of the following: a local area network, a wide area network, a wired network, a wireless network, the Internet, an intranet, a storage area network, a cellular network, or any other appropriate communication network. Rider system 102 and driver system 104 comprise user systems (e.g., computing systems for operation by users). In some embodiments, one or more of rider system 102 and driver system 104 comprises a system accessed by a user directly (e.g., the user is in proximity with the user system). In the example shown, rider system 102 and driver system 104 comprise mobile devices (e.g., smartphones, tablet computers, etc.). Rider system 102 and driver system 104 comprise systems accessing driver dispatch server system 106 (e.g., accessing driver dispatch server system 106 via network 100). In some embodiments, driver system 104 comprises a system for a casual driver (e.g., a driver giving a ride compatible with an associated typical route, e.g., a commute route). In various embodiments, there are 2, 5, 22, 122, 4320, 26100, or any other appropriate number of user systems (e.g., rider systems and driver systems) accessing driver dispatch server system 106. Driver dispatch server system 106 comprises a system for managing drivers giving rides to riders. In some embodiments, driver dispatch server system 106 comprises a system for connecting a rider and a driver. In some embodiments, driver dispatch server system 106 comprises a system for determining a driver to assign a ride. In some embodiments, driver dispatch server system 106 comprises a system for assigning multiple rides to a driver. In some embodiments, driver dispatch server system 106 comprises a system for driver screening. In some embodiments, driver dispatch server system 106 comprises a system for assigning a casual ride to a driver. In some embodiments, driver dispatch server system 106 comprises a system for determining a typical route for a driver. In various embodiments, driver dispatch server system 106 comprises a computer, a computer with multiple processors, multiple computers connected via a local network, multiple computers connected via a wide area network, multiple computers connected via the Internet, multiple computers connected via network 100, or any other appropriate computing system or systems. In various embodiments, the processors comprising rider system 102, driver system 104, and driver dispatch server system 106 comprise any one of a variety of proprietary or commercially available single or multi-processor systems (e.g., an Intel™-based processor) or other type of commercially available processor able to support communications in accordance with a particular embodiment and application.

Figure 2:
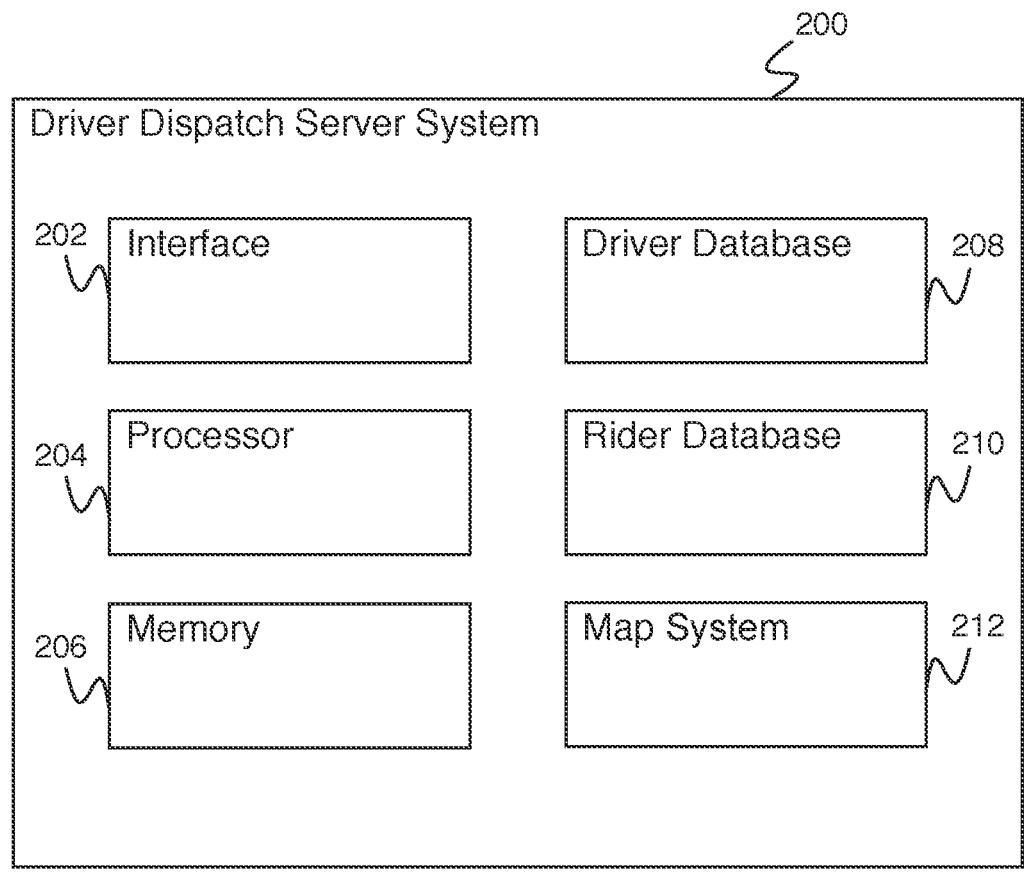
FIG. 2 is a block diagram illustrating an embodiment of a driver dispatch server system.

FIG. 2 is a block diagram illustrating an embodiment of a driver dispatch server system. In some embodiments, driver dispatch server system 200 comprises driver dispatch server system 106 of FIG. 1. In the example shown, driver dispatch server system 200 comprises interface 202. In various embodiments, interface 202 comprises an interface for receiving ride requests, sending rider notifications, receiving rider accept and deny indications, sending connect notifications, receiving location information (e.g., global position system information from a plurality of rider systems), sending and receiving ride start notifications, sending and receiving ride complete notifications, sending and receiving donation information, sending and receiving driver rating information, sending and receiving rider rating information, sending donation summary information, sending and receiving test drive requests, sending and receiving driver approval information, receiving driver application information, providing driver tutorial videos, requesting a criminal background check, sending and receiving social media information, or sending or receiving any other appropriate information. In some embodiments, interface 202 communicates with a user system (e.g., a driver mobile device or a rider mobile device) via a network. Processor 204 comprises a processor for receiving, processing, and providing information. In some embodiments, processor 204 determines a driver to match with a rider. In various embodiments, processor 204 determines a driver to match with a rider based on route information, based on social media information, based on shared ride information, based on user ratings, or based on any other appropriate information. In some embodiments, processor 204 determines a set of riders to match for a shared ride. In various embodiments, processor 204 determines riders for a shared ride based on ride request compatibility, based on user ratings, or based on any other appropriate information. Memory 206 comprises a memory coupled to processor 204 and configured to provide processor 204 with instructions. Driver database 208 comprises driver information (e.g., driver names, driver schedules, driver histories, driver ratings, driver donation amounts, driver images, driver car images, etc.) Rider database comprises rider information (e.g., rider names, rider histories, rider ratings, rider donation amounts, rider images, rider social media opt in information, etc.). Map system 212 comprises map information. In some embodiments, processor 204 uses map information from map system 212 to plan routes. In various embodiments, mapping system 212 is used to determine time between two points and/or street routing, or any other appropriate system function.

In some embodiments, a user system is provided software from driver dispatch server system 200 that enables a user system to communicate with the dispatch system and perform rider request functionality. In various embodiments, rider request functionality includes one or more of the following: sending ride requests, receiving rider notifications, sending rider accept and deny indications, receiving connect notifications, sending location information, sending and receiving ride start notifications, sending and receiving ride complete notifications, sending and receiving donation information, sending and receiving driver rating information, sending and receiving rider rating information, receiving donation summary information, or sending or receiving any other appropriate information.

Figure 3:
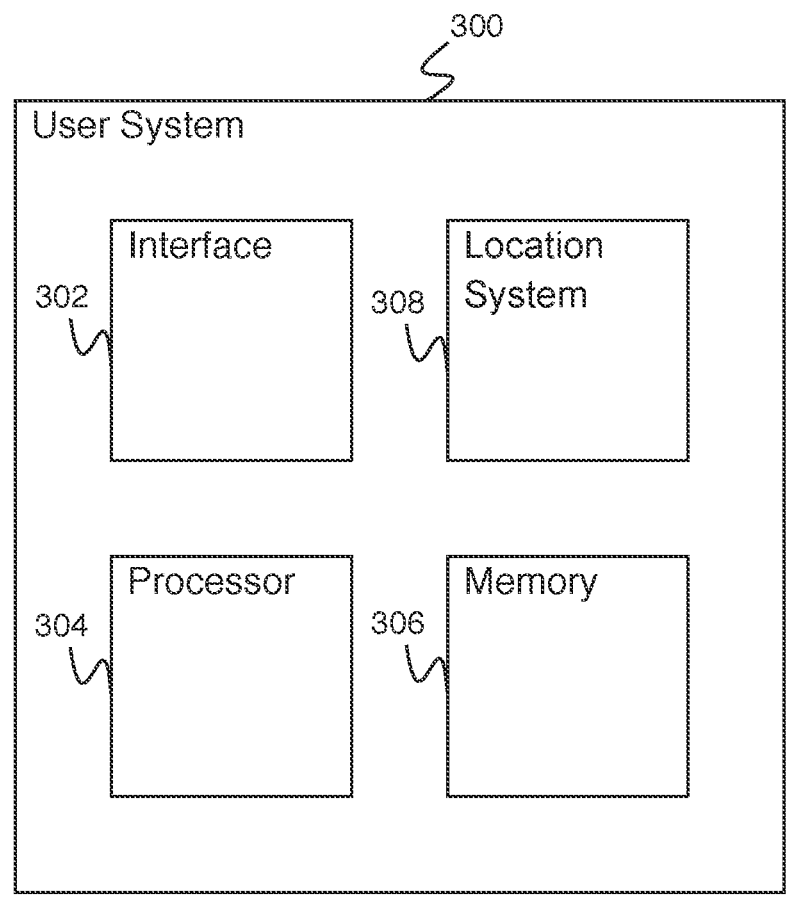
FIG. 3 is a block diagram illustrating an embodiment of a user system.

FIG. 3 is a block diagram illustrating an embodiment of a user system. In some embodiments, user system 300 of FIG. 3 comprises rider system 102 of FIG. 1. In some embodiments, user system 300 of FIG. 3 comprises driver system 104 of FIG. 1. In the example shown, user system 300 comprises interface 302. In various embodiments, interface 302 comprises an interface for sending ride requests, receiving rider notifications, sending rider accept and deny indications, receiving connect notifications, sending location information, sending and receiving ride start notifications, sending and receiving ride complete notifications, sending and receiving donation information, sending and receiving driver rating information, sending and receiving rider rating information, receiving donation summary information, or sending or receiving any other appropriate information. Processor 304 receives information from interface 302 and determines what information should be sent by interface 302. Memory 306 comprises a memory coupled to processor 304 and configured to provide processor 304 with instructions. Location system 308 comprises a system for determining a user system position—for example, a global positioning system (GPS), a cell tower location system (e.g., using relative signal strength information as measured using a signal strength determiner, triangulation determination, etc. to determine relative location to one or more cell towers), etc. In some embodiments, location information (e.g., GPS position information) is transmitted by interface 302 to a driver dispatch server system.

In some embodiments, user system 300 receives software from a dispatch system (e.g., driver dispatch server system 200) that enables user system 300 to communicate with the dispatch system and perform rider request functionality. In various embodiments, rider request functionality includes one or more of the following: sending ride requests, receiving rider notifications, sending rider accept and deny indications, receiving connect notifications, sending location information, sending and receiving ride start notifications, sending and receiving ride complete notifications, sending and receiving donation information, sending and receiving driver rating information, sending and receiving rider rating information, receiving donation summary information, or sending or receiving any other appropriate information.

Figure 4:
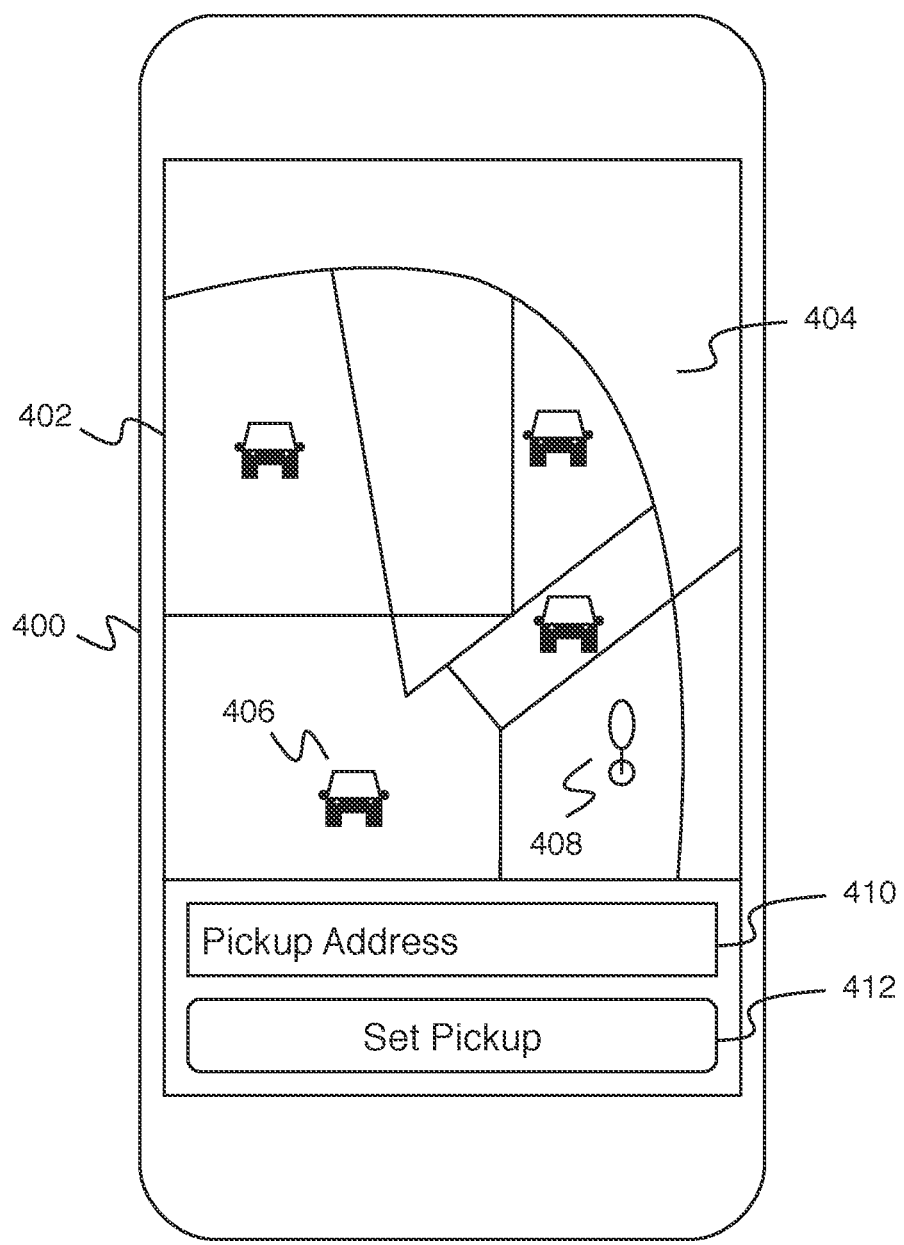
FIG. 4 is a diagram illustrating an embodiment of a user device display for a default display for indicating a pickup address to a rider system.

FIG. 4 is a diagram illustrating an embodiment of a user device display for a default display for indicating a pickup address to a rider system. In some embodiments, the diagram of FIG. 4 illustrates the display of rider system 102 of FIG. 1. In the example shown, rider system 400 comprises display 402. Display 402 comprises a default display for a rider system. Display 402 comprises map 404, displaying the local area around the rider system. Map 404 comprises local roads and geographical features, car icons indicating active driver systems (e.g., car icon 406) and a pin icon indicating the rider system position (e.g., pin icon 408). In some embodiments, the set of car icons indicating active driver systems comprises a set of potential drivers. Display 402 additionally comprises pickup address entry field 410 and set pickup button 412. Pickup address entry field 410 comprises a field for a rider to enter an address to be picked up at. In some embodiments, a rider types a pickup address into pickup address entry field 410. In some embodiments, pickup address entry field 410 defaults to a default pickup address. In some embodiments, the default pickup address is the rider current address. In some embodiments, the default pickup address comprises an address derived from the rider current address. In some embodiments, the default pickup address comprises a commonly used pickup address. In some embodiments, the rider can access a list of commonly used pickup addresses (e.g., by tapping on pickup address entry field 410, by swiping up on map 404, by tapping on a commonly used addresses button, or by performing any other appropriate user interface action). Set pickup button 412 initiates request of a ride using the currently entered or selected pickup address. In some embodiments, a rider additionally indicates a dropoff location (e.g., by typing the location into a text box, by dropping a pin on a map, etc.). In some embodiments, the rider indicates a pick up time or time window.

Figure 5:
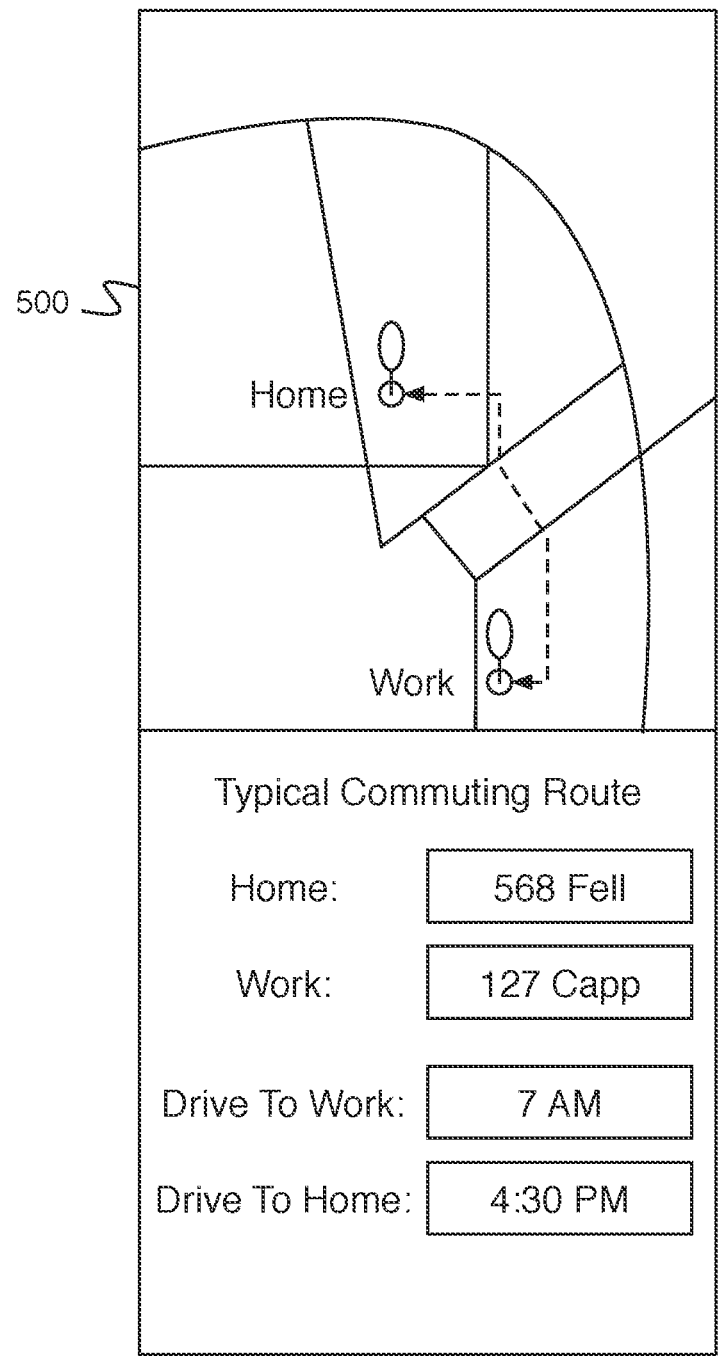
FIG. 5 is a diagram illustrating an embodiment of a typical route for a driver.

FIG. 5 is a diagram illustrating an embodiment of a typical route for a driver. In some embodiments, map 500 shows a typical commuting route for a casual driver. In some embodiments, a casual driver comprises a casual driver using a driver system (e.g., driver system 104 of FIG. 1). In some embodiments, a casual driver is associated with a typical route (e.g., a typical commuting route). In some embodiments, the driver drives the typical route from home to work in the morning and from work to home in the evening. In some embodiments, the driver drives the typical route at any other appropriate time of day or night. In some embodiments, the route is entered by the casual driver into the driver system. In some embodiments, driver drives their typical route and the casual driver system determines the typical route automatically. For example, the user system stores location information from a GPS system or other location information to determine a first location (e.g., a home location) and a second location (e.g., a work location) and determines automatically over time a typical route between the first and second locations (e.g., most used route over a period of time—a month, a year, a week, etc.). In some embodiments, the typical route information is stored and transmitted to the dispatch server system by the user system software automatically so that the typical route and departure/arrival times can be updated using recent commute patterns (e.g., most recent week, month, year, etc.). In various embodiments, typical route and/or route times are determined and stored for different days of the week, different seasons, different months, different event days (e.g., game days, bicycle commute event days, etc.), or any other appropriate changes in commute patterns. In some embodiments, a typical commute route comprises a home location, a work location, a drive to work time, and a drive to home time. In the example shown, the casual driver lives at 568 Fell and works at 127 Capp, and drives from home to work at 7 AM and from work to home at 4:30 PM.

Figure 6:
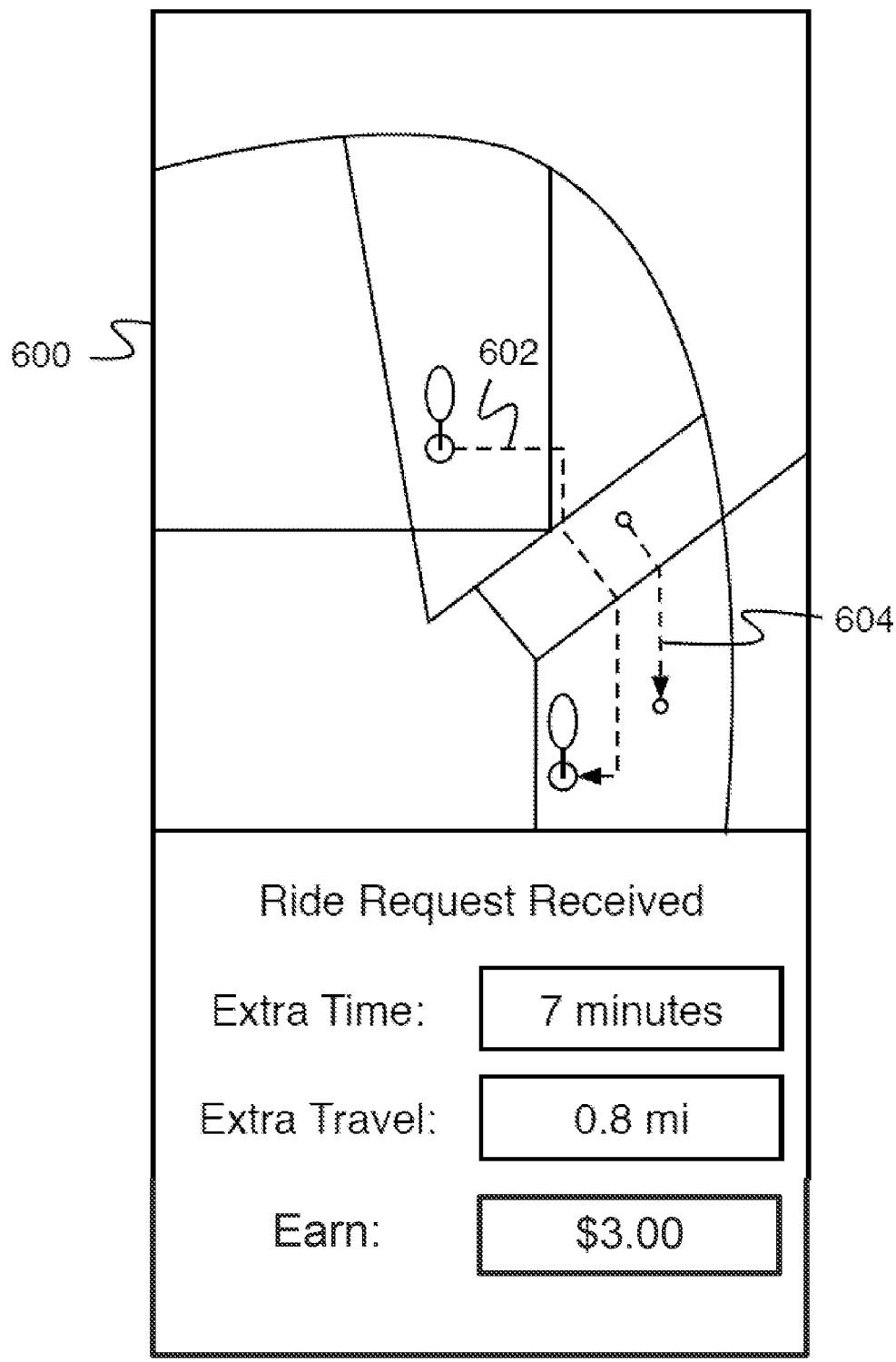
FIG. 6 is a diagram illustrating an embodiment of a ride request.

FIG. 6 is a diagram illustrating an embodiment of a ride request. In some embodiments, map 600 shows typical route 602 and ride request 604. In the example shown, ride request 604 is similar to typical route 602. A driver dispatch server system (e.g., driver dispatch server system 106 of FIG. 1) determines the compatibility between typical route 602 and ride request 604. In some embodiments, the compatibility comprises a time compatibility (e.g., whether the extra time for the casual driver to provide the ride is less than an extra time threshold). In some embodiments, the compatibility comprises a route compatibility (e.g., whether the extra travel for the casual driver to provide the ride is less than an extra travel threshold). In some embodiments, the driver dispatch server system determines the casual driver with the associated typical route that is most compatible with the ride request and provides the casual driver with the request. In some embodiments, when the driver dispatch server system provides a casual driver with a ride request, the driver dispatch server system provides the casual driver with the extra time and extra travel associated with giving the ride so that the casual driver can make an informed decision about whether to accept the ride request. In some embodiments, the driver dispatch server system provides the casual driver with a compensation amount that the casual driver would earn in the event that the casual driver provided a ride to a rider.

In various embodiments, generating an ordered list of drivers that are offered to drive the rider that requested a ride is made using one or more of the following prioritizations: prioritizing drivers with lower detours (e.g., distance and/or time), prioritizing drivers with lower pickup estimated times of arrival (ETAs), prioritizing most predictable (e.g., regularly timed departure and/or arrival times) drivers first, prioritizing drivers with high accept and/or low cancellation ratios, prioritizing drivers with quick request acknowledgement times, prioritizing new (e.g., unactivated, just activated, etc.) drivers, or any other appropriate prioritization or combination of prioritizations. In some embodiments, a next driver is offered the ride after notifying a prior driver has had a time period in which to respond but no response has been received (e.g., 30 seconds, 60 seconds, etc.).

In some embodiments, passenger waitlists get unlocked or higher priority when a sufficient number of employees of a company sign up to be a driver (e.g., greater than a threshold or fraction of the company employees). In some embodiments, passenger waitlists get unlocked or higher priority when a sufficient number of residence of a building or block or complex sign up to be a driver (e.g., greater than a threshold or a fraction of the residence population). In some embodiments, passenger waitlists get unlocked or higher priority when a sufficient number of users sign up to be a driver or a passenger of a particular route (e.g., greater than a threshold or a fraction of the residence population).

Figure 7:
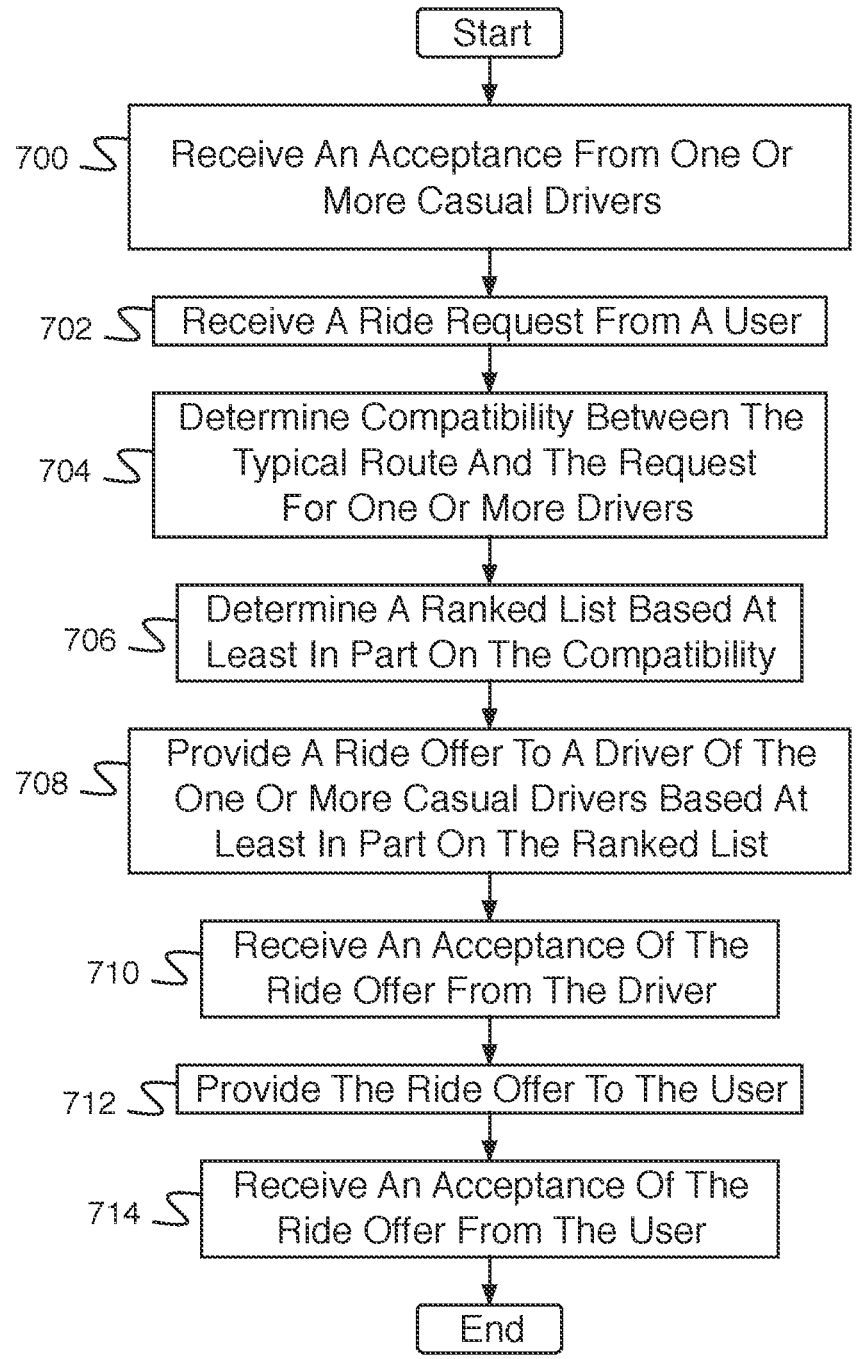
FIG. 7 is a flow diagram illustrating an embodiment of a process for casual driver ride sharing.

FIG. 7 is a flow diagram illustrating an embodiment of a process for casual driver ride sharing. In some embodiments, the process of FIG. 7 is executed by a driver dispatch server system (e.g., driver dispatch server system 106 of FIG. 1). In the example shown, in 700, an acceptance (e.g., to be a casual driver) is received from one or more casual drivers. For example, one or more drivers signs up for being a casual driver. In some embodiments, a casual driver of the one or more casual drivers directly inputs an associated typical route (e.g., a commute route, a drop off to school route, a pick up route, etc.). In some embodiments, the system determines a typical route based on the casual driver behavior. In 702, a ride request from a user is received. In various embodiments, a ride request comprises a desired ride start location, a desired ride end location, a desired pickup time, or any other appropriate ride request information. In 704, a compatibility between the typical route and the request is determined, for one or more drivers. In 706, a ranked list is determined based at least in part on the compatibility. In some embodiments, the ranked list is determined by sorting the typical routes from most compatible to least compatible. In 708, a ride offer is provided to a driver of the one or more casual drivers based at least in part on the ranked list. In some embodiments, the ride offer comprises an additional time (e.g., how much extra time it will take the driver to provide the ride). In some embodiments, the ride offer comprises an additional distance (e.g., how much extra distance the driver may be driven to provide the ride). In 710, an acceptance of the ride offer is received from the driver. In 712, the ride offer is provided to the user (e.g., the user is provided an indication of the expected time and/or distance for the ride and allowed to determine if the ride is desired). In 714, an acceptance of the ride offer is received from the user.

Figure 8:
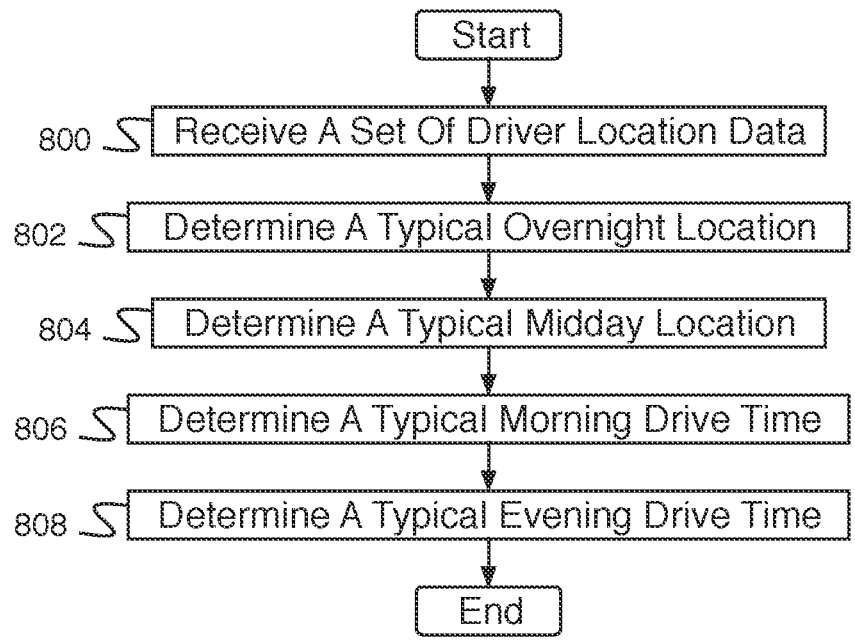
FIG. 8 is a flow diagram illustrating an embodiment of a process for determining a typical route associated with a casual driver.

FIG. 8 is a flow diagram illustrating an embodiment of a process for determining a typical route associated with a casual driver. In some embodiments, the process of FIG. 8 is executed by a driver dispatch server system (e.g., driver dispatch server system 106 of FIG. 1). In the example shown, in 800, a set of driver location data is received. In various embodiments, driver location data comprises GPS data or other location information, cellular registration data, driver check-in data, or any other appropriate driver location data. In 802, a typical overnight location is determined. In some embodiments, a typical overnight location is determined by examining driver location data during overnight periods (e.g., 10 PM to 6 AM using the GPS information or other location information from the user system) and determining the most common location the driver is seen during that period. In 804, a typical midday location is determined. In some embodiments, a typical midday location is determined by examining driver location data during midday periods (e.g., 11 AM to 5 PM using the GPS information or other location information from the user system) and determining the most common location the driver is seen during that period. In 806, a typical morning drive time is determined. In some embodiments, a typical morning drive time is determined by determining the average time that the user ceases to be seen at the overnight location and begins to be seen at the midday location. In some embodiments, a typical morning drive time is determined by determining the most often observed and stored time that the user ceases to be seen at the overnight location and begins to be seen at the midday location (e.g., most often observed time for departure within a 15 minute window as observed over the course of a period of time—for example, a week, a month, a year, etc.). In 808, a typical evening drive time is determined. In some embodiments, the typical evening drive time is determined by determining the average time that the user ceases to be seen at the midday location and begins to be seen at the overnight location. In some embodiments, the typical evening drive time is determined by determining the most often observed and stored time that the user ceases to be seen at the midday location and begins to be seen at the overnight location (e.g., most often observed time for departure within a 15 minute window as observed over the course of a period of time—for example, a week, a month, a year, etc.).

Figure 9:
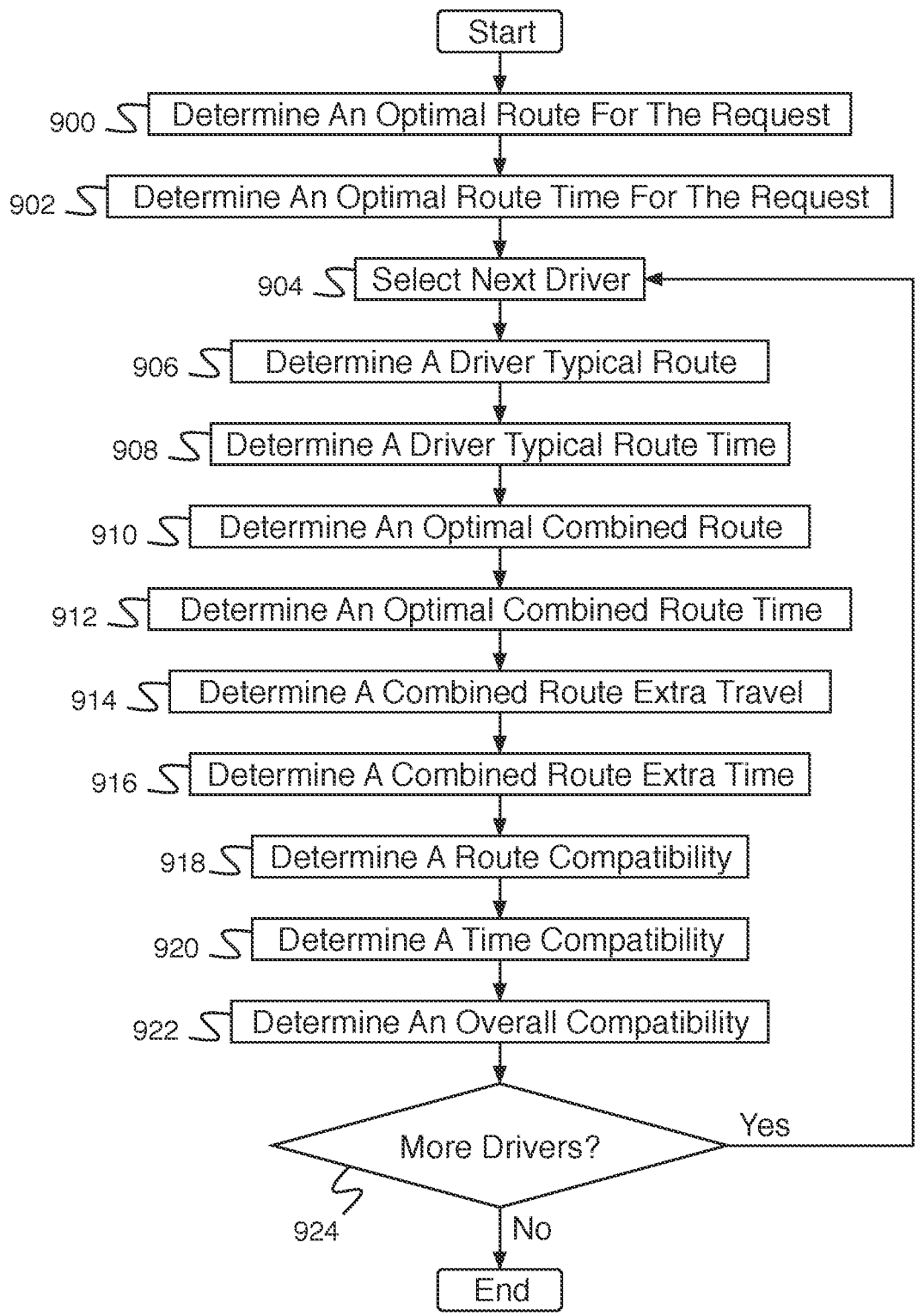
FIG. 9 is a flow diagram illustrating an embodiment of a process for determining compatibility between a typical route and a request, for one or more drivers.

FIG. 9 is a flow diagram illustrating an embodiment of a process for determining compatibility between a typical route and a request, for one or more drivers. In some embodiments, the process of FIG. 9 implements 704 of FIG. 7. In the example shown, in 900, an optimal route is determined for the request. In 902, an optimal route time is determined for the request. In 904, a next driver is selected. In some embodiments, the next driver comprises the first driver. In 906, a typical driver route is determined. In some embodiments, a typical driver route is retrieved from storage. In 908, a typical driver route time is determined. In 910, an optimal combined route is determined. In some embodiments, the optimal combined route comprises the shortest route for the driver to begin at the start point of the typical route and end at the end point of the typical route, performing the ride request along the way. In 912, an optimal combined route time is determined. In 914, a combined route extra travel is determined. In some embodiments, the combined route extra travel comprises the optimal combined route distance minus the driver typical route distance. In 916, a combined route extra time is determined. In some embodiments, a combined route extra time comprises the optimal combined route time minus the driver typical route time. In 918, a route compatibility is determined. In various embodiments, the route compatibility comprises a score based at least in part on the combined route extra travel, the combined route extra time, a combination of the combined route extra travel and the combined route extra time, or any other appropriate factors. In 9280, a time compatibility is determined. In some embodiments, a time compatibility comprises a time differential between the typical time the driver will arrive at the user start location and the time the user wants to be picked up. In some embodiments, determining a time compatibility comprises providing a request that the driver begin driving the typical route and receiving a response indicating whether the driver is willing to begin driving the typical route. In 922 an overall compatibility is determined. In some embodiments, an overall compatibility comprises a combination of a route compatibility and a time compatibility. In 924 it is determined whether there are more drivers (e.g., of a set of one or more casual drivers). In the event it is determined that there are more drivers control passes to 904. In the event it is determined that there are not more drivers, the process ends.

Figure 10:
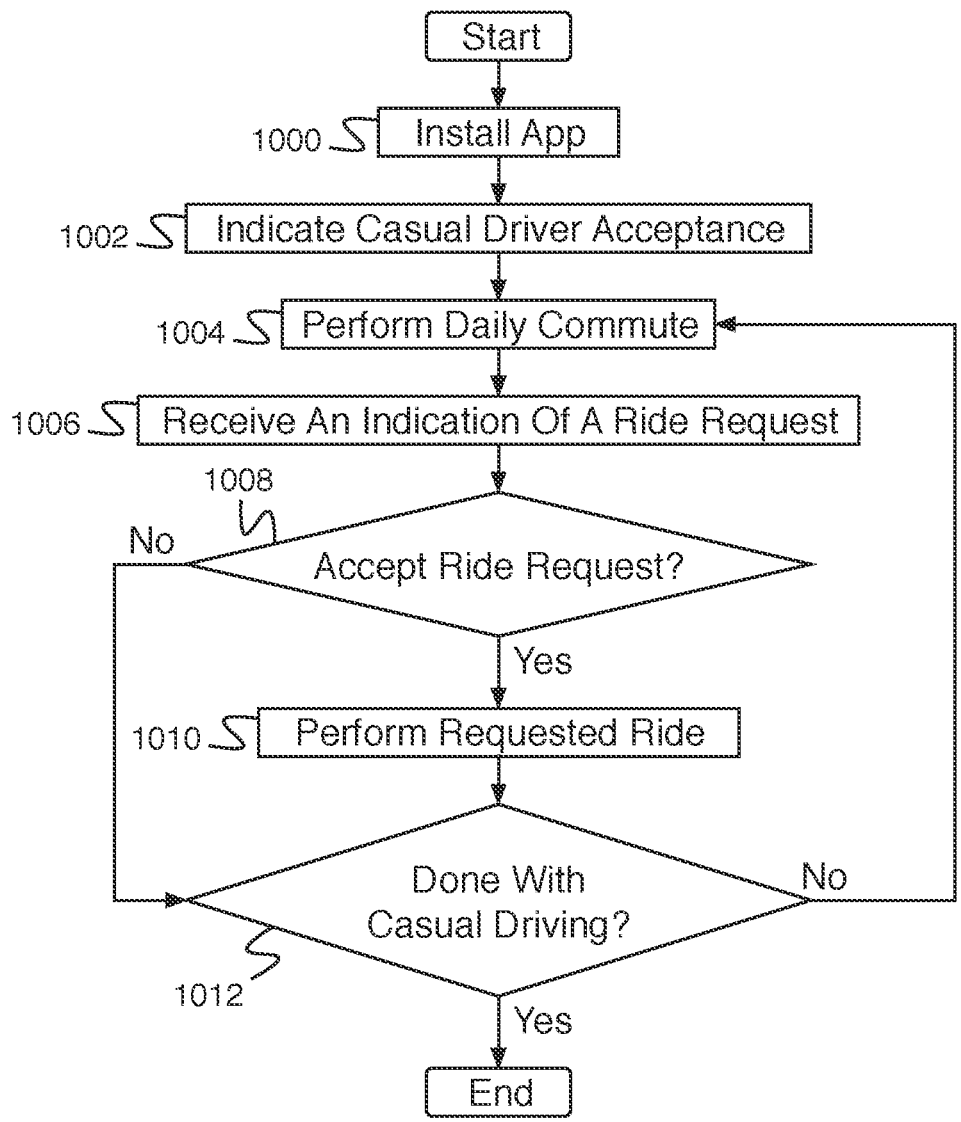
FIG. 10 is a flow diagram illustrating an embodiment of a process for a casual driver.

FIG. 10 is a flow diagram illustrating an embodiment of a process for a casual driver. In some embodiments, the process of FIG. 10 comprises a process for a driver using a driver system (e.g., driver system 104 of FIG. 1) interacting with a driver dispatch server system (e.g., driver dispatch server system 106 of FIG. 1). In the example shown, in 1000, the driver installs the casual driver app (e.g., on the driver system). In 1002, casual driver acceptance (e.g., to be part of the casual driver system) is indicated. In 1004, the driver daily commute is performed (e.g., for any appropriate number of days). In some embodiments, as the daily commute is performed, the driver dispatch server system determines the typical daily commute associated with the driver. In 1006, an indication of a ride request is received. In various embodiments, the ride request comprises a ride pickup location, a ride dropoff location, a desired pickup time, a ride additional time (e.g., how much time performing the ride will add to the driver's commute), a ride additional distance (e.g., how much distance performing the ride will add to the driver's commute), or any other appropriate information. In 1008, the driver determines whether to accept the ride request. In the event the driver determines not to accept the ride request, control passes to 1012. In the event the driver determines to accept the ride request, control passes to 1010. In 1010, the driver performs the requested ride. In 1012, the driver determines whether to be done with casual driving. In the event the driver determines not to be done with casual driving, control passes to 1004. In the event the driver determines to be done with casual driving, the process ends.

Although the foregoing embodiments have been described in some detail for purposes of clarity of understanding, the invention is not limited to the details provided. There are many alternative ways of implementing the invention. The disclosed embodiments are illustrative and not restrictive.

We claim:
1. A computer-implemented method, comprising:
  generating a transportation route between a pickup location and a destination location of a transportation request corresponding to a rider mobile device;

determining a typical route associated with a driver mobile device;

based on determining a compatibility between the typical route of the driver mobile device and the transportation route, providing, for display via a user interface of the driver mobile device:

a digital map portraying the transportation route, the pickup location, and the destination location; and a compatibility metric comprising at least one of an extra time or an extra distance corresponding to the typical route and the transportation route; and based on a user interaction via the user interface of the driver mobile device, transmitting instructions to the driver mobile device to respond to the transportation request and navigate a vehicle along the transportation route.

2. The computer-implemented method of claim 1, further comprising based on determining the compatibility between the typical route of the driver mobile device and the transportation route, providing, for display via the user interface of the driver mobile device a compensation value, the compatibility metric, and the digital map portraying the transportation route.

3. The computer-implemented method of claim 1, further comprising based on determining the compatibility between the typical route of the driver mobile device and the transportation route, providing, for display via the user interface of the driver mobile device the digital map comprising the transportation route, a starting location of the typical route, and an ending location of the typical route.

4. The computer-implemented method of claim 3, further comprising based on determining the compatibility between the typical route of the driver mobile device and the transportation route, providing, for display via the user interface of the driver mobile device the digital map comprising the transportation route, the starting location of the typical route, the ending location of the typical route, the pickup location, and the destination location.

5. The computer-implemented method of claim 1, wherein providing, for display via the user interface of the driver mobile device, the compatibility metric comprises: providing, for display, a first compatibility metric comprising the extra time and a second compatibility metric comprising the extra distance.

6. The computer-implemented method of claim 1, wherein determining the compatibility comprises determining a time compatibility by comparing the extra time to an extra time threshold.

7. The computer-implemented method of claim 1, wherein determining the compatibility comprises determining a route compatibility by comparing the extra distance to an extra travel threshold.

8. A non-transitory computer readable storage medium comprising instructions that, when executed by at least one processor, cause a server device to:

generate a transportation route between a pickup location and a destination location of a transportation request corresponding to a rider mobile device;

determine a typical route associated with a driver mobile device;

based on determining a compatibility between the typical route of the driver mobile device and the transportation route, provide, for display via a user interface of the driver mobile device:

a digital map portraying the transportation route, the pickup location, and the destination location; and a compatibility metric comprising at least one of an extra time or an extra distance corresponding to the typical route and the transportation route; and based on a user interaction via the user interface of the driver mobile device, transmit instructions to the driver mobile device to respond to the transportation request and navigate a vehicle along the transportation route.

9. The non-transitory computer readable storage medium of claim 8, further comprising instructions that, when executed by at least one processor, cause the server device to, based on determining the compatibility between the typical route of the driver mobile device and the transportation route, provide, for display via the user interface of the driver mobile device a compensation value, the compatibility metric, and the digital map portraying the transportation route.

10. The non-transitory computer readable storage medium of claim 8, further comprising instructions that, when executed by at least one processor, cause the server device to, based on determining the compatibility between the typical route of the driver mobile device and the transportation route, provide, for display via the user interface of the driver mobile device the digital map comprising the transportation route, a starting location of the typical route, and an ending location of the typical route.

11. The non-transitory computer readable storage medium of claim 10, further comprising instructions that, when executed by at least one processor, cause the server device to, based on determining the compatibility between the typical route of the driver mobile device and the transportation route, providing, for display via the user interface of the driver mobile device the digital map comprising the transportation route, the starting location of the typical route, the ending location of the typical route, the pickup location, and the destination location.

12. The non-transitory computer readable storage medium of claim 8, further comprising instructions that, when executed by at least one processor, cause the server device to provide, for display via the user interface of the driver mobile device, the compatibility metric by providing, for display, a first compatibility metric comprising the extra time and a second compatibility metric comprising the extra distance.

13. The non-transitory computer readable storage medium of claim 8, further comprising instructions that, when executed by at least one processor, cause the server device to determine the compatibility by determining a time compatibility by comparing the extra time to an extra time threshold.

14. The non-transitory computer readable storage medium of claim 8, further comprising instructions that, when executed by at least one processor, cause the server device to determine the compatibility by determining a route compatibility by comparing the extra distance to an extra travel threshold.

15. A system comprising:

at least one processor; and a non-transitory computer readable storage medium comprising instructions that, when executed by the at least one processor, cause the system to:

generate a transportation route between a pickup location and a destination location of a transportation request corresponding to a rider mobile device;

determine a typical route associated with a driver mobile device;

based on determining a compatibility between the typical route of the driver mobile device and the transportation route, provide, for display via a user interface of the driver mobile device:
- a digital map portraying the transportation route, the pickup location, and the destination location; and
- a compatibility metric comprising at least one of an extra time or an extra distance corresponding to the typical route and the transportation route; and
- based on a user interaction via the user interface of the driver mobile device, transmit instructions to the driver mobile device to respond to the transportation request and navigate a vehicle along the transportation route.

16. The system of claim 15, further comprising instructions that, when executed by the at least one processor, cause the system to, based on determining the compatibility between the typical route of the driver mobile device and the transportation route, provide, for display via the user interface of the driver mobile device a compensation value, the compatibility metric, and the digital map portraying the transportation route.

17. The system of claim 15, further comprising instructions that, when executed by the at least one processor, cause the system to, based on determining the compatibility between the typical route of the driver mobile device and the transportation route, provide, for display via the user interface of the driver mobile device the digital map comprising the transportation route, a starting location of the typical route, and an ending location of the typical route.

18. The system of claim 17, further comprising instructions that, when executed by the at least one processor, cause the system to, based on determining the compatibility between the typical route of the driver mobile device and the transportation route, providing, for display via the user interface of the driver mobile device the digital map comprising the transportation route, the starting location of the typical route, the ending location of the typical route, the pickup location, and the destination location.

19. The system of claim 15, further comprising instructions that, when executed by the at least one processor, cause the system to provide, for display via the user interface of the driver mobile device, the compatibility metric by providing, for display, a first compatibility metric comprising the extra time and a second compatibility metric comprising the extra distance.

20. The system of claim 15, further comprising instructions that, when executed by the at least one processor, cause the system to determine the compatibility by:
- determining a time compatibility by comparing the extra time to an extra time threshold; or
- determining a route compatibility by comparing the extra distance to an extra travel threshold.

* * * * *